MEANS OF MEASURING CARRIER FREQUENCY OF MODULATED SIGNAL

Filed May 26, 1959

INVENTOR.
ARNOLD GEWIRTZ
BY
ATTORNEYS

United States Patent Office 3,025,467 Patented Mar. 13, 1962

3,025,467

MEANS OF MEASURING CARRIER FREQUENCY OF MODULATED SIGNAL

Arnold Gewirtz, Plainview, N.Y., assignor, by mesne assignments, to the United States of America as represented by the Secretary of the Navy Filed May 26, 1959, Ser. No. 816,028
4 Claims. (Cl. 324—79)

The present invention relates to frequency monitoring and more particularly to an FM signal center-frequency monitor.

In the prior art the most common method of frequency monitoring is the zero beat method, i.e., beating the signal with a variable known frequency until zero is obtained indicating the two frequencies are equal. In the case of an FM signal however, this has been found to be unsatisfactory because of the garbled sound due to the multiplicity of side bands. Another method known to the prior art of monitoring FM signals is metering the output of a discriminator tuned to the desired center frequency. It would seem that a zero indication on the meter would be a sufficient indication or monitor of the desired center frequency. However, it can be shown that with a center frequency of 500 kilocycles and a voltage swing of 20 volts for a 50 kilocycle swing in frequency a mere tenth of a volt error in meter reading would represent a frequency deviation of 250 cycles. Thus, even with a highly sensitive discriminator and an accurate meter, the error could be excessive. It is also noted that the use of a meter would present the operator with an additional visual indicator which can be disadvantageous in certain environments.

It is therefore an object of the present invention to provide an FM center-frequency monitor in which no garbling of output due to multiple side bands is present.

Another object of the present invention is to provide FM center-frequency monitoring in which the need for a meter is obviated.

A further object of the present invention is to provide an FM center-frequency monitor which is simple to operate and reasonably error-proof.

According to the invention the signal produced by an oscillator tuned by means of an electrically controllable inductor and the FM signal to be monitored are beat in a mixer, the difference of which is amplified and discriminated and fed back to the control winding of the electrically controllable inductor. If the center frequency of the FM signal is correct the difference frequency between the FM signal and the oscillator will be that frequency at which the discriminator is tuned and the output to the control winding will be zero. The electrically controllable inductor-tuned oscillator is also fed to a second mixer along with a standard oscillator signal. The standard oscillator signal is set to oscillate at the zero control winding frequency of the electrically controllable inductor-tuned oscillator. This of course will produce a zero beat at the output of the mixer which can be easily monitored by head phones. It is seen that if the FM signal frequency deviates, the output from a first mixer will be something other than that frequency to which the discriminator is tuned, and an output will be presented to the control winding of the electrically controllable inductor-tuned oscillator, shifting its frequency and thereby producing a note at the output of the second mixer.

Other objects and many of the attendant advantages of this invention will be readily appreciated as the same becomes better understood by reference to the following detailed description when considered in connection with the accompanying drawings in which.

Figure 1:
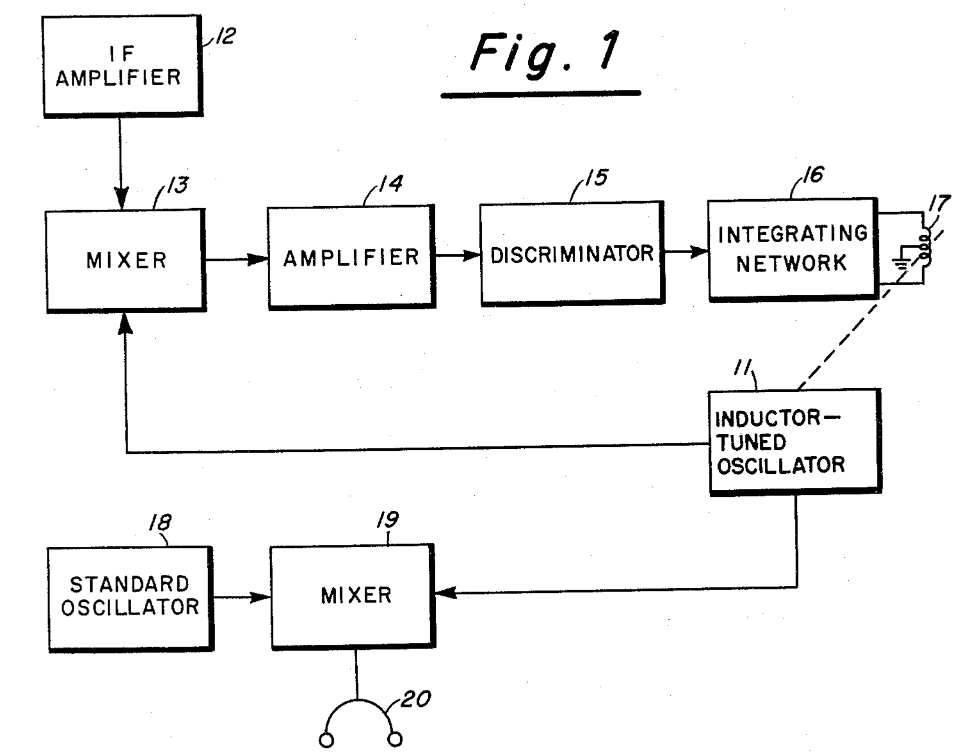
FIG. 1 is a block diagram of the preferred embodiment of the invention.

Referring to FIGURE 1 there is shown at 11 an electrically controllable inductor-tuned oscillator an output of which is connected to mixer 13 along with an output from IF strip 12. The difference frequency is then coupled through amplifier 14 into discriminator 15 and the output of discriminator 15 is fed to the integrating network 16. The output of the integrating network is then fed through control winding 17 which controls the frequency of oscillator 11. Electrically controllable inductor-tuned oscillator 11 is also coupled to mixer 19 along with standard oscillator 18 the output of which is fed to ear phones 20.

OPERATION OF FIG. 1

Oscillator 11 generates a voltage whose frequency is controlled by an electrically controllable inductor whose inductance is a function of the current in control winding 17. This type of inductor is commercially available from C. G. S. Laboratories, Inc. under the trademark "Increductor." When the control winding current is zero, the oscillator 11 is operating at the same frequency as standard oscillator 18 to produce a zero beat through mixer 19 into ear phones 20. Frequencies will now be assigned to the oscillators and signal for the purposes of illustration only and not to be construed as limiting the invention. Assuming a zero control winding current frequency of 1250 kilocycles for the oscillator 11 and also 1250 kilocycles for the standard oscillator 18 it is seen that at this condition there will be a zero beat present in ear phones 20 due to the heterodyning in mixer 19. The sum of the two frequencies will be far above the audible range. Also for the purpose of illustration assume that the hignal 12 is the output of an IF strip tuned to a center frequency of 500 kilocycles. Thus for the purposes of explanation the system is being used to monitor a center frequency of a frequency-modulated signal at 500 kilocycles. The output from mixer 13 will then be 1250 kilocycles minus 500 kilocycles if signal 12 is at the proper center frequency or 750 kilocycles. This is amplified by tuned amplifier 14 and fed into discriminator 16 which is tuned to a center frequency of 750 kilocycles. If the signal is at 500 kilocycles there will be no output from discriminator 15 hence no current through control winding 17 so that the electrically controllable inductor-tuned oscillator 11 will remain at the zero control winding current condition of 1250 kilocycles. Thus, the zero beat in head phones 20 will indicate a center frequency from IF amplifier 12 of 500 kilocycles. Should the signal frequency from 12 deviate, the output from mixer 13 will no longer be at 750 kilocycles and a positive or negative output, as the case may be, will be presented from the discriminator to the integrating network 16 and hence through control winding 17. This will in turn shift the increductor controlled oscillator 11 by an amount in the audible range and produce this frequency shift at the output of mixer 19 and in ear phones 20. This will, of course, indicate that the signal frequency from IF amplifier 12 is not operating at a center frequency of 500 kilocycles. The integrating network 16 is necessary to prevent a false indication due to the frequency shift of signal frequency producing a shifting output from mixer 13 and hence from discriminator 15. This integrating network can be any of the conventional R-C type in which the signal is actually averaged. In this case the average signal if the center frequency is correct will be zero.

It was found in this application that the conventional discriminator network could not be used due to the low impedance of the control winding, and the need for linearity over approximately a 50-kilocycle band width. Also sensitivity had to be great enough to provide sufficient output with as little as one KC of modulation. A conventional discriminator circuit as for example, shown in F. E. Terman's Radio Engineering, Third Edition, page 523, FIG. 10–13(*a*) was inadequate due to a false resonance caused by the conventional RF choke. It was also found that replacing this choke by resistor reduced the output. Thus the need for a special discriminator for use in this system developed.

Figure 2:
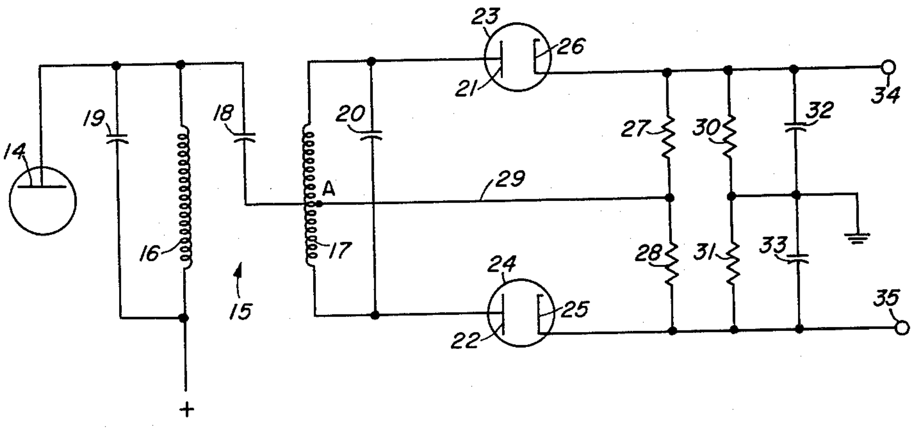
FIG. 2 is a schematic representation of a special discriminator circuit utilized in conjunction with the system of FIG. 1.

Referring now to FIGURE 2 the discriminator used is shown in schematic form being coupled from the last stage of IF amplifier 14. The output of IF amplifier 14 is coupled to the discriminator through transformer 15, the primary 16 and capacitor 19 forming a tuned circuit in the output of amplifier 14, and the secondary 17 of transformer 15 and capacitor 20 forming a tuned circuit at the input of the discriminator. As is conventional, capacitor 18 is connected between the plate of the last IF stage and the center tap of the secondary 17 of the transformer 15. The secondary 17 is coupled to the plates 21 and 22 of diodes 23 and 24 respectively, the cathodes 25 and 26 being connected together through resistors 27 and 28. The junction of the resistors are returned through lead 29 directly to the center tap "A" of secondary 17. This is the major point in which this discriminator deviates from the conventional discriminator circuit. Resistors 30 and 31 are also tied in series across cathodes 25 and 26 as are capacitors 32 and 33. The junctions of the capacitors 32 and 33 and resistors 30 and 31 are grounded. The outputs are taken from the cathodes at terminals 34 and 35. The output impedance must be necessarily low due to the low impedance of the control winding 17 of the electrically controllable inductor-tuned oscillator 11. This necessitates a low value for resistors 27 and 28. In order to prevent shorting point "A" to ground through these low resistors, resistors 30 and 31 are made much larger than resistors 27 and 28. This keeps point "A" at a neutral potential without actually shorting it to ground. Capacitors 32 and 33 are RF bypass connectors as is conventional in the art.

Thus it is seen that through the present invention conventional zero beat techniques can be used for monitoring center frequency of an FM signal, the main advantages obtained are that whereas the signal contains FM the beat frequency signal that is heard in the head phones has no FM and the use of precision discriminators and meters has been obviated.

Obviously many modifications and variations of the present invention are possible in the light of the above teachings. It is therefore to be understood that within the scope of the appended claims the invention may be practiced otherwise than as specifically described.

What is claimed is:

1. A frequency monitor comprising a first oscillator tuned by an electrically controllable inductor, said inductor having a control winding, an angle modulated signal to be monitored, said first oscillator and said angle modulated signal coupled to a first mixer, a discriminator tuned to the difference of the angle modulated signal and said first oscillator frequencies coupled to the output of the first mixer, an integrating network connected to the output of said discriminator, said control winding connected to the output of said integrating network, a second oscillator tuned to the zero control winding current frequency of the said first oscillator, said second oscillator and said first oscillator connected to a second mixer, and a zero-beat indicator connected to the output of said second mixer.

2. The frequency monitor of claim 1 wherein said discriminator comprises an input transformer having a primary and a secondary tuned to the mid-frequency of the signal to be detected coupling the signal to be detected from an intermediate frequency amplifier, one side of said primary connected to the positive side of the power amplifier supply, the other side of said primary connected through a first capacitor to a center tap on said secondary, two diodes having a cathode and a plate each side of said secondary going to a different plate of said diodes, a first pair of equal resistors connected in series between said cathodes, the junction of said first pair of resistors connected to said center tap, a second pair of equal resistors connected in series between said cathodes, the junction of said second pair of resistors connected to ground, and an output taken at said cathodes.

3. The frequency monitor of claim 2 in which a tuned amplifier is interposed between said first mixer and said discriminator.

4. The frequency monitor of claim 3 wherein said zero-beat indicator is a pair of earphones.

References Cited in the file of this patent

UNITED STATES PATENTS

| | | |
|---|---|---|
| 1,982,340 | Forbes | Nov. 27, 1934 |
| 2,291,715 | Hepp | Aug. 4, 1942 |
| 2,309,481 | Summerhayes | Jan. 26, 1943 |
| 2,519,765 | Jeffries et al. | Aug. 22, 1950 |
| 2,539,673 | Peterson | Jan. 30, 1951 |
| 2,705,282 | Parode et al. | Mar. 29, 1955 |
| 2,798,952 | Cutler et al. | July 9, 1957 |